United States Patent
Kyrtsos et al.

(10) Patent No.: US 9,896,126 B2
(45) Date of Patent: Feb. 20, 2018

(54) JACKKNIFE DETECTION FOR VEHICLE REVERSING A TRAILER

(71) Applicant: Ford Global Technologies, LLC, Dearborn, MI (US)

(72) Inventors: Christos Kyrtsos, Beverly Hills, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/794,336

(22) Filed: Jul. 8, 2015

(65) Prior Publication Data
US 2017/0008560 A1    Jan. 12, 2017

(51) Int. Cl.
| | | |
|---|---|---|
| B62D 13/06 | (2006.01) | |
| B62D 15/02 | (2006.01) | |
| B60W 30/06 | (2006.01) | |
| B60W 10/20 | (2006.01) | |
| B60W 10/18 | (2012.01) | |

(52) U.S. Cl.
CPC ............ *B62D 13/06* (2013.01); *B60W 10/18* (2013.01); *B60W 10/20* (2013.01); *B60W 30/06* (2013.01); *B62D 15/021* (2013.01); *B60W 2600/00* (2013.01); *B60W 2710/18* (2013.01); *B60W 2710/20* (2013.01)

(58) Field of Classification Search
USPC ............ 701/42, 41, 37; 188/112 A; 180/235, 180/411, 445; 280/442
See application file for complete search history.

(56) References Cited

U.S. PATENT DOCUMENTS

| | | | |
|---|---|---|---|
| 3,542,390 A | 11/1970 | Fikse | |
| 3,756,624 A | 9/1973 | Taylor | |
| 3,860,257 A | 1/1975 | Mesly | |
| 3,948,567 A * | 4/1976 | Kasselmann | ......... B60T 8/1708 180/14.1 |
| 4,042,132 A | 8/1977 | Bohman et al. | |

(Continued)

FOREIGN PATENT DOCUMENTS

| | | |
|---|---|---|
| CN | 202159367 U | 3/2012 |
| DE | 3931518 A1 | 4/1991 |

(Continued)

OTHER PUBLICATIONS

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

(Continued)

*Primary Examiner* — Richard Goldman
(74) *Attorney, Agent, or Firm* — Raymond Coppiellie; Price Heneveld LLP

(57) ABSTRACT

A backup assist system for a vehicle reversing a trailer includes a hitch angle sensor providing a measured hitch angle of the trailer. The system also includes a controller determining a position of the measured hitch angle in relation to an unknown jackknife angle by monitoring a predetermined dynamic hitch angle characteristic derived from the measured hitch angle for a corresponding jackknife indicating characteristic.

6 Claims, 10 Drawing Sheets

(56) References Cited

U.S. PATENT DOCUMENTS

| | | | |
|---|---|---|---|
| 4,196,936 A * | 4/1980 | Snyder | B60T 8/248 |
| | | | 188/112 A |
| 4,735,432 A | 4/1988 | Brown | |
| 4,752,080 A | 6/1988 | Rogers | |
| 4,848,499 A | 7/1989 | Martinet et al. | |
| 4,856,850 A * | 8/1989 | Aichele | B60T 13/662 |
| | | | 188/156 |
| 5,001,639 A | 3/1991 | Breen | |
| 5,108,158 A | 4/1992 | Breen | |
| 5,246,242 A | 9/1993 | Penzotti | |
| 5,247,442 A | 9/1993 | Kendall | |
| 5,558,350 A | 9/1996 | Kimbrough et al. | |
| 5,586,814 A | 12/1996 | Steiner | |
| 6,042,196 A * | 3/2000 | Nakamura | B60T 7/12 |
| | | | 188/112 R |
| 6,056,371 A | 5/2000 | Lin et al. | |
| 6,292,094 B1 | 9/2001 | Deng et al. | |
| 6,351,698 B1 | 2/2002 | Kubota et al. | |
| 6,389,342 B1 | 5/2002 | Kanda | |
| 6,409,288 B2 | 6/2002 | Yoshida et al. | |
| 6,494,476 B2 | 12/2002 | Masters et al. | |
| 6,498,977 B2 | 12/2002 | Wetzel et al. | |
| 6,567,731 B2 | 5/2003 | Chandy | |
| 6,838,979 B2 | 1/2005 | Deng et al. | |
| 6,854,557 B1 * | 2/2005 | Deng | B62D 7/159 |
| | | | 180/235 |
| 7,032,705 B2 | 4/2006 | Zheng et al. | |
| 7,117,077 B2 | 10/2006 | Michi et al. | |
| 7,136,754 B2 | 11/2006 | Hahn et al. | |
| 7,139,650 B2 | 11/2006 | Lubischer | |
| 7,154,385 B2 | 12/2006 | Lee et al. | |
| 7,165,820 B2 | 1/2007 | Rudd, III | |
| 7,219,913 B2 | 5/2007 | Atley | |
| 7,319,927 B1 | 1/2008 | Sun et al. | |
| 7,546,191 B2 | 6/2009 | Lin et al. | |
| 7,690,737 B2 | 4/2010 | Lu | |
| 7,706,944 B2 | 4/2010 | Tanaka et al. | |
| 7,715,953 B2 | 5/2010 | Shepard | |
| 7,793,965 B2 | 9/2010 | Padula | |
| 7,969,326 B2 | 6/2011 | Sakakibara | |
| 8,010,253 B2 | 8/2011 | Lundquist | |
| 8,033,955 B2 | 10/2011 | Farnsworth | |
| 8,036,792 B2 | 10/2011 | Dechamp | |
| 8,108,116 B2 | 1/2012 | Mori et al. | |
| 8,139,109 B2 | 3/2012 | Schmiedel et al. | |
| 8,170,726 B2 | 5/2012 | Chen et al. | |
| 8,244,442 B2 | 8/2012 | Craig et al. | |
| 8,260,518 B2 | 9/2012 | Englert | |
| 8,267,485 B2 | 9/2012 | Barlsen et al. | |
| 8,280,607 B2 | 10/2012 | Gatti et al. | |
| 8,374,749 B2 | 2/2013 | Tanaka | |
| 8,430,792 B2 | 4/2013 | Noll | |
| 8,469,125 B2 | 6/2013 | Yu et al. | |
| 8,571,758 B2 | 10/2013 | Klier et al. | |
| 8,755,982 B2 | 6/2014 | Heckel et al. | |
| 8,755,984 B2 | 6/2014 | Rupp et al. | |
| 8,798,860 B2 | 8/2014 | Dechamp | |
| 8,909,426 B2 | 12/2014 | Rhode et al. | |
| 8,930,140 B2 | 1/2015 | Trombley et al. | |
| 9,102,271 B2 | 8/2015 | Trombley et al. | |
| 9,108,598 B2 | 8/2015 | Headley | |
| 9,132,856 B2 | 9/2015 | Shepard | |
| 9,156,496 B2 | 10/2015 | Greenwood et al. | |
| 9,164,955 B2 | 10/2015 | Lavoie et al. | |
| 9,180,890 B2 | 11/2015 | Lu et al. | |
| 9,227,474 B2 | 1/2016 | Liu | |
| 9,229,453 B1 | 1/2016 | Lee | |
| 9,248,858 B2 | 2/2016 | Lavoie et al. | |
| 9,315,212 B1 | 4/2016 | Kyrtsos et al. | |
| 9,335,162 B2 | 5/2016 | Kyrtsos et al. | |
| 9,340,228 B2 | 5/2016 | Xu et al. | |
| 9,500,497 B2 | 11/2016 | Lavoie et al. | |
| 2001/0037164 A1 | 11/2001 | Hecker | |
| 2001/0052434 A1 | 12/2001 | Ehrlich et al. | |
| 2004/0222881 A1 | 11/2004 | Deng et al. | |
| 2005/0206224 A1 | 9/2005 | Lu | |
| 2005/0206225 A1 | 9/2005 | Offerle et al. | |
| 2005/0206229 A1 | 9/2005 | Lu et al. | |
| 2005/0236201 A1 | 10/2005 | Spannheimer et al. | |
| 2005/0236896 A1 | 10/2005 | Offerle et al. | |
| 2006/0103511 A1 | 5/2006 | Lee et al. | |
| 2006/0142936 A1 | 6/2006 | Dix | |
| 2007/0027581 A1 | 2/2007 | Bauer et al. | |
| 2007/0198190 A1 | 8/2007 | Bauer et al. | |
| 2008/0177443 A1 | 7/2008 | Lee et al. | |
| 2008/0231701 A1 | 9/2008 | Greenwood et al. | |
| 2009/0082935 A1 | 3/2009 | Leschuk et al. | |
| 2009/0157260 A1 | 6/2009 | Lee | |
| 2009/0198425 A1 | 8/2009 | Englert | |
| 2009/0271078 A1 | 10/2009 | Dickinson | |
| 2009/0306854 A1 | 12/2009 | Dechamp | |
| 2009/0306861 A1 | 12/2009 | Schumann et al. | |
| 2009/0326775 A1 | 12/2009 | Nishida | |
| 2010/0152989 A1 | 6/2010 | Smith et al. | |
| 2011/0087398 A1 | 4/2011 | Lu et al. | |
| 2012/0041658 A1 | 2/2012 | Turner | |
| 2012/0095649 A1 | 4/2012 | Klier et al. | |
| 2012/0200706 A1 | 8/2012 | Greenwood et al. | |
| 2012/0271512 A1 | 10/2012 | Rupp et al. | |
| 2012/0271514 A1 | 10/2012 | Lavoie et al. | |
| 2012/0271515 A1 | 10/2012 | Rhode et al. | |
| 2012/0271522 A1 | 10/2012 | Rupp et al. | |
| 2012/0283909 A1 | 11/2012 | Dix | |
| 2012/0310594 A1 | 12/2012 | Watanabe | |
| 2012/0316732 A1 | 12/2012 | Auer | |
| 2013/0148748 A1 | 6/2013 | Suda | |
| 2013/0179038 A1 | 7/2013 | Goswami et al. | |
| 2013/0268160 A1 * | 10/2013 | Trombley | B62D 13/06 |
| | | | 701/42 |
| 2014/0052337 A1 | 2/2014 | Lavoie et al. | |
| 2014/0058614 A1 | 2/2014 | Trombley et al. | |
| 2014/0058622 A1 | 2/2014 | Trombley et al. | |
| 2014/0058655 A1 | 2/2014 | Trombley et al. | |
| 2014/0058668 A1 | 2/2014 | Trombley et al. | |
| 2014/0067154 A1 | 3/2014 | Yu et al. | |
| 2014/0067155 A1 | 3/2014 | Yu et al. | |
| 2014/0085472 A1 | 3/2014 | Lu et al. | |
| 2014/0121930 A1 | 5/2014 | Allexi et al. | |
| 2014/0160276 A1 | 6/2014 | Pliefke et al. | |
| 2014/0172232 A1 | 6/2014 | Rupp et al. | |
| 2014/0188344 A1 | 7/2014 | Lavoie | |
| 2014/0188346 A1 | 7/2014 | Lavoie | |
| 2014/0210456 A1 | 7/2014 | Crossman | |
| 2014/0218506 A1 | 8/2014 | Trombley et al. | |
| 2014/0218522 A1 | 8/2014 | Lavoie et al. | |
| 2014/0222288 A1 | 8/2014 | Lavoie et al. | |
| 2014/0236532 A1 | 8/2014 | Trombley et al. | |
| 2014/0249691 A1 | 9/2014 | Hafner et al. | |
| 2014/0249723 A1 * | 9/2014 | Pilutti | B62D 15/027 |
| | | | 701/42 |
| 2014/0267688 A1 | 9/2014 | Aich et al. | |
| 2014/0267689 A1 | 9/2014 | Lavoie | |
| 2014/0267868 A1 | 9/2014 | Mazzola et al. | |
| 2014/0267869 A1 | 9/2014 | Sawa | |
| 2014/0277941 A1 * | 9/2014 | Chiu | B62D 13/06 |
| | | | 701/41 |
| 2014/0277942 A1 | 9/2014 | Kyrtsos et al. | |
| 2014/0297128 A1 | 10/2014 | Lavoie et al. | |
| 2014/0297129 A1 | 10/2014 | Lavoie et al. | |
| 2014/0303847 A1 | 10/2014 | Lavoie | |
| 2014/0309888 A1 | 10/2014 | Smit et al. | |
| 2014/0324295 A1 | 10/2014 | Lavoie | |
| 2014/0343795 A1 | 11/2014 | Lavoie | |
| 2014/0358429 A1 | 12/2014 | Shutko et al. | |
| 2014/0379217 A1 | 12/2014 | Rupp et al. | |
| 2015/0025732 A1 | 1/2015 | Min et al. | |
| 2015/0057903 A1 | 2/2015 | Rhode et al. | |
| 2015/0066296 A1 | 3/2015 | Trombley et al. | |
| 2015/0066298 A1 | 3/2015 | Sharma et al. | |
| 2015/0120141 A1 | 4/2015 | Lavoie et al. | |
| 2015/0134183 A1 | 5/2015 | Lavoie et al. | |
| 2015/0138340 A1 | 5/2015 | Lavoie | |
| 2015/0158527 A1 | 6/2015 | Hafner et al. | |
| 2015/0203156 A1 | 7/2015 | Hafner et al. | |

(56) References Cited

U.S. PATENT DOCUMENTS

| | | |
|---|---|---|
| 2015/0210317 A1 | 7/2015 | Hafner et al. |
| 2015/0217693 A1 | 8/2015 | Pliefke et al. |
| 2015/0232092 A1 | 8/2015 | Fairgrieve et al. |
| 2016/0009288 A1 | 1/2016 | Yu |
| 2016/0039456 A1 | 2/2016 | Lavoie et al. |
| 2016/0052548 A1* | 2/2016 | Singh .................. B60D 1/36 701/37 |
| 2016/0059888 A1 | 3/2016 | Bradley et al. |
| 2016/0129939 A1 | 5/2016 | Singh et al. |
| 2016/0152263 A1* | 6/2016 | Singh .................. B60T 8/1708 701/41 |
| 2017/0008560 A1* | 1/2017 | Kyrtsos .................. B62D 13/06 |

FOREIGN PATENT DOCUMENTS

| | | |
|---|---|---|
| DE | 9208595 U1 | 8/1992 |
| DE | 10154612 A1 | 5/2003 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102007029413 A1 | 1/2009 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102010029184 A1 | 11/2011 |
| EP | 0418653 A1 | 3/1991 |
| EP | 1361543 A2 | 11/2003 |
| EP | 1655191 A1 | 5/2006 |
| EP | 1810913 A1 | 7/2007 |
| EP | 2388180 A2 | 11/2011 |
| EP | 2644477 A1 | 10/2013 |
| FR | 2515379 A1 | 4/1983 |
| JP | 09267762 A | 10/1997 |
| JP | 10119739 A | 5/1998 |
| JP | 2012166580 A | 9/2012 |
| WO | 0044605 A1 | 8/2000 |
| WO | 2012059207 A1 | 5/2012 |
| WO | 2012103193 A1 | 8/2012 |
| WO | 2013186208 A2 | 12/2013 |
| WO | 2015187467 A1 | 12/2015 |

OTHER PUBLICATIONS

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

Haviland, G S, "Automatic Brake Control for Trucks—What Good Is It?", TRID, Society of Automotive Engineers, Sep. 1968, 1 pg.

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

Divelbiss, A.W.; Wen, J.T.; "Trajectory Tracking Control of a Car-Trailer System", IEEE, Control Systems Technology, Aug. 6, 2002, vol. 5, No. 3, 1 pg.

Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.

"Understanding Tractor-Trailer Performance", Caterpillar, 2006, pp. 1-28.

C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, pp. 1-8.

Olof Enqvist, "AFS-Assisted Trailer Reversing," Institutionen för systemteknik Deartment of Electrical Engineering, Jan. 27, 2006, 57 pgs.

Cedric Pradalier, Kane Usher, "Robust Trajectory Tracking for a Reversing Tractor-Trailer System", (Draft), Field and Service Robotics Conference, CSIRO ICT Centre, Jul. 2007, 16 pages.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.

Cedric Pradalier, Kane Usher, "Experiments in Autonomous Reversing of a Tractor-Trailer System", 6th International Conference on Field and Service Robotics, inria-00195700, Version 1, Dec. 2007, 10 pgs.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pgs.

"2012 Edge—Trailer Towing Selector", Brochure, Preliminary 2012 RV & Trailer Towing Guide Information, 2011, 3 pgs.

"Ford Super Duty: Truck Technologies", Brochure, Sep. 2011, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 1 pg.

Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012, 2 pgs.

"Optionally Unmanned Ground Systems for any Steering-Wheel Based Vehicle" Universal. Unmanned., Kairos Autonomi, website: http://www.kairosautonomi.com/pronto4_system.html, retrieved Sep. 26, 2014, 2 pgs.

Micah Steele, R. Brent Gillespie, "Shared Control Between Human and Machine: Using a Haptic Steering Wheel to Aid in Land Vehicle Guidance", University of Michigan, Date Unknown, 5 pgs.

* cited by examiner

JACKKNIFE DETECTION FOR VEHICLE REVERSING A TRAILER

FIELD OF THE INVENTION

The present invention generally relates to trailer motion and parameter estimation and condition detection, and more particularly to the detection of a hitch angle approaching an unknown jackknife angle based on dynamic characteristics of the hitch angle.

BACKGROUND OF THE INVENTION

Reversing a vehicle while towing a trailer can be challenging for many drivers, particularly for drivers that drive with a trailer on an infrequent basis or with various types of trailers. Systems used to assist a driver with backing a trailer frequently measure or estimate the position of the trailer relative to the vehicle with a sensor that determines a hitch angle. Among uses of this detected or estimated hitch angle is the determination of the hitch angle relative to a jackknife angle of the trailer relative to the vehicle. In general, a jackknife angle represents the maximum angle at which a change in direction of the trailer relative to the vehicle can be made with a maximum steering input in either direction, while the vehicle is still reversing. If a vehicle is reversed in a jackknife condition, in which the hitch angle is greater than the jackknife angle, the trailer will approach the vehicle, which could lead to a collision therebetween. Accordingly, the accuracy and reliability of hitch angle detection or estimation relative to the jackknife angle can be critical to the operation of the backup assist system.

SUMMARY OF THE INVENTION

According to one aspect of the present invention, a backup assist system for a vehicle reversing a trailer includes a hitch angle sensor providing a measured hitch angle of the trailer. The system also includes a controller determining a position of the measured hitch angle in relation to an unknown jackknife angle, which is generally dependent on vehicle and trailer dimensions, by monitoring a predetermined dynamic hitch angle characteristic derived from the measured hitch angle for a corresponding jackknife indicating characteristic.

According to another aspect of the present invention, a vehicle includes a steering system and a hitch angle detector. The vehicle also includes a control system coupled with the steering system and implementing a backup mode for reversing a trailer including controlling the steering system to maintain the trailer along a path. The controller is further coupled with the hitch angle detector for determining a relationship between a measured hitch angle and an unknown jackknife angle by monitoring a predetermined dynamic hitch angle characteristic for development of a jackknife indicator, which develops in a manner determined by the actual jackknife angle.

According to another aspect of the present invention, a method for assisting reversing of a vehicle with a trailer includes controlling a steering angle of a vehicle steering system to maintain the trailer along a user-selected reversing curvature path, continuously measuring a hitch angle of the trailer relative to the vehicle, and monitoring a predetermined dynamic hitch angle characteristic for development of a jackknife indicator. The method further includes determining a relationship between the measured hitch angle and an unknown jackknife angle based on development of the jackknife indicator.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
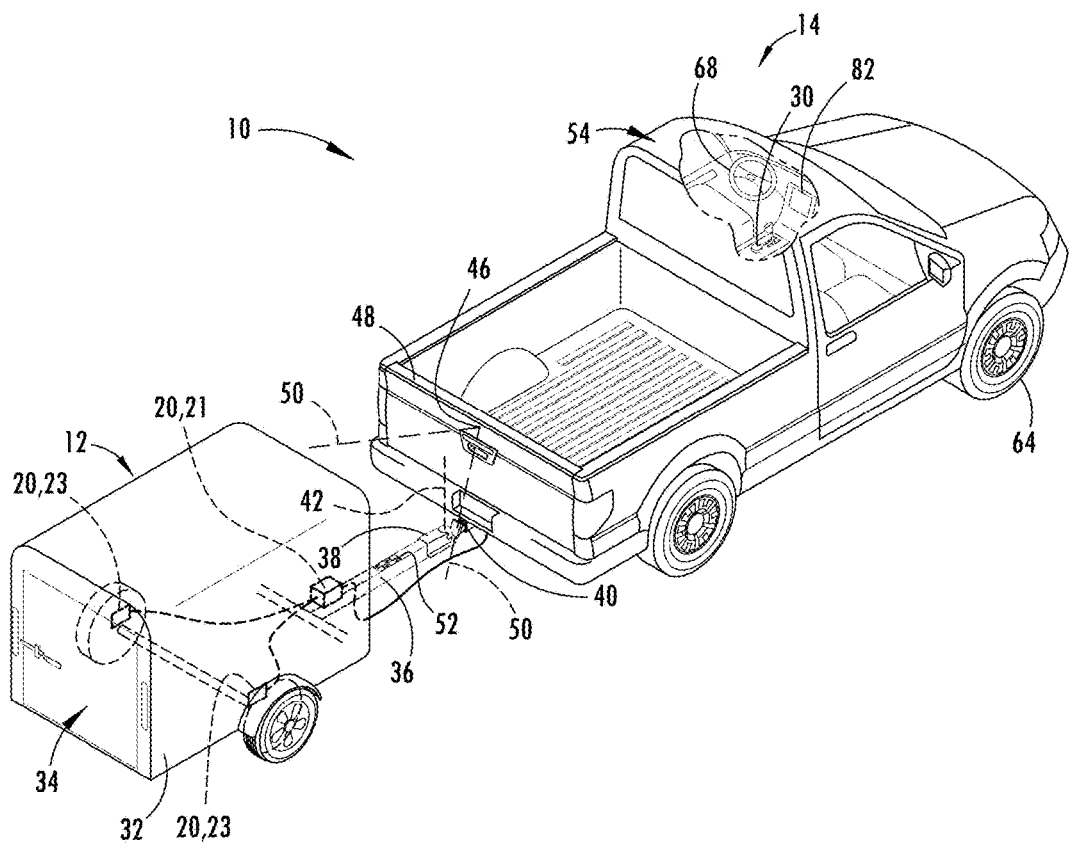
FIG. 1 is a top perspective view of a vehicle attached to a trailer with one embodiment of a hitch angle sensor for operating a trailer backup assist system.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-5, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. The system 10, as shown in FIGS. 6-9, further includes functionality related to determining whether an angle of the trailer 12 relative to the vehicle 14, referred to as the hitch angle $\gamma$, is approaching a jackknife angle $\gamma(j)$ that may not be known within system 10. In an embodiment, to implement such functionality, the system may include a hitch angle sensor 44 providing a measured hitch angle $\gamma$ of the trailer 12. A controller 28 determines a position of the measured hitch angle $\gamma$ in relation to the unknown jackknife $\gamma(j)$ angle by monitoring a predetermined hitch angle characteristic derived from the measured hitch angle $\gamma$ for a corresponding jackknife angle indicating characteristic.

Figure 2:
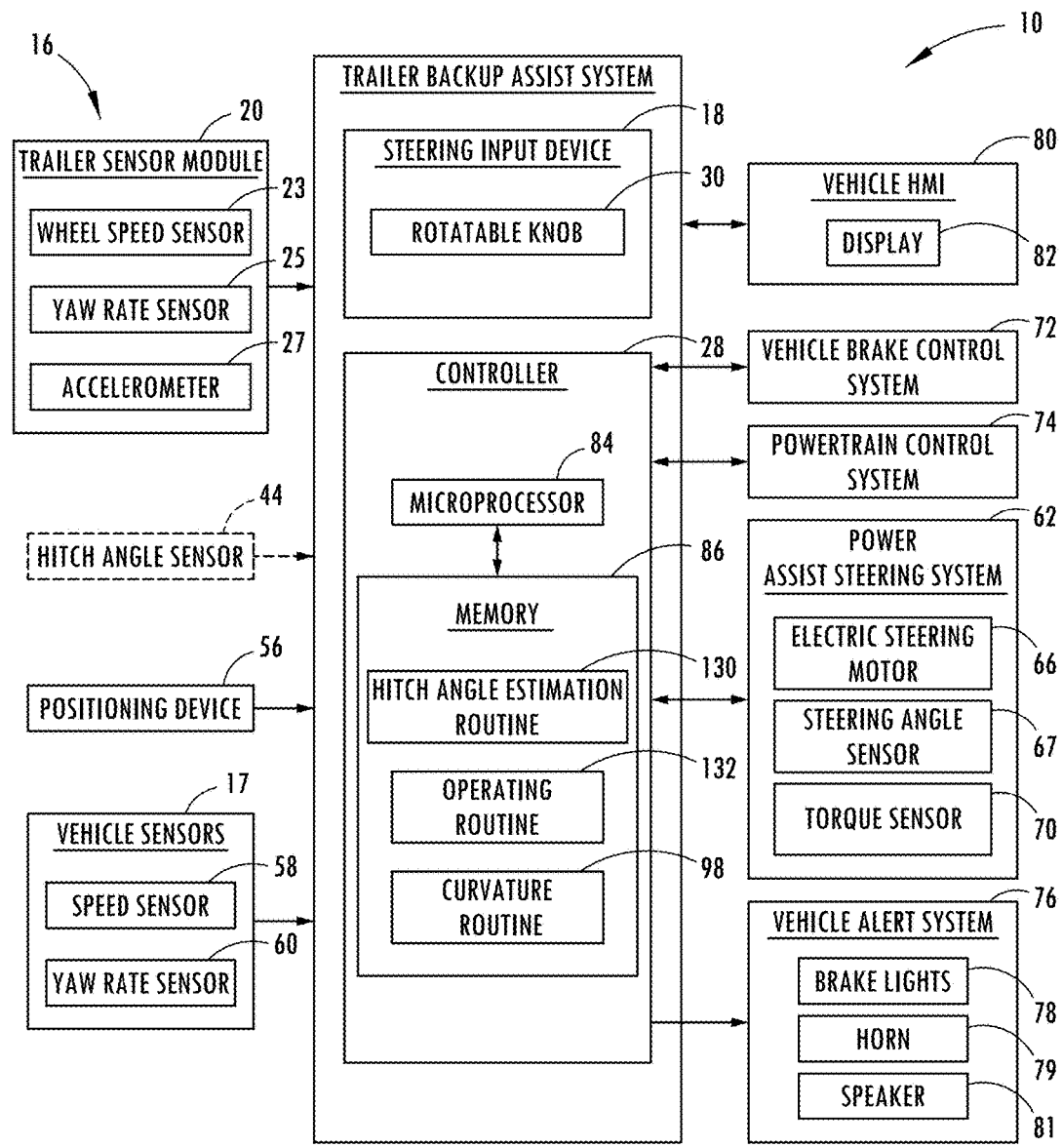
FIG. 2 is a block diagram illustrating one embodiment of the trailer backup assist system having a steering input device, a curvature controller, and a trailer braking system.

With respect to the general operation of the trailer backup assist system 10, as illustrated in the system diagram of FIG. 2, a steering input device 18 may be provided, such as a rotatable knob 30 (also shown in FIGS. 10 and 11), for a driver to provide the desired curvature 26 (FIG. 11) of the trailer 12. As such, the steering input device 18 may be operable between a plurality of selections, such as successive rotated positions of a knob 30, that each provide an incremental change to the desired curvature 26 of the trailer 12. With reference to the embodiment of the trailer backup assist system 10 shown in FIG. 2, the trailer backup assist system 10 receives vehicle and trailer status-related information from various sensors and devices. This information includes positioning information from a positioning device 56, which may include a global positioning system (GPS) on the vehicle 14 or a handheld device, to determine a coordinate location of the vehicle 14 and the trailer 12 based on the location of the positioning device 56 with respect to the trailer 12 and/or the vehicle 14. The positioning device 56 may additionally or alternatively include a dead reckoning system for determining the coordinate location of the vehicle 14 and the trailer 12 within a localized coordinate system based at least on vehicle speed, steering angle, and hitch angle $\gamma$. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, a hitch angle sensor 44, a proximity sensor, and other vehicle sensors and devices may provide sensor signals or other information, such as successive images of the trailer 12, that the controller of the trailer backup assist system 10 may process with various routines to determine an indicator of the hitch angle $\gamma$, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering ("EPAS") system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

With continued reference to FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. The trailer backup assist system 10 can, further, provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions, as described further below. Examples of unacceptable trailer backup conditions include, but are not limited to, a vehicle 14 over-speed condition, a high hitch angle rate, potentially uncontrollable trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like, as also described further below. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 2). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display 82, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
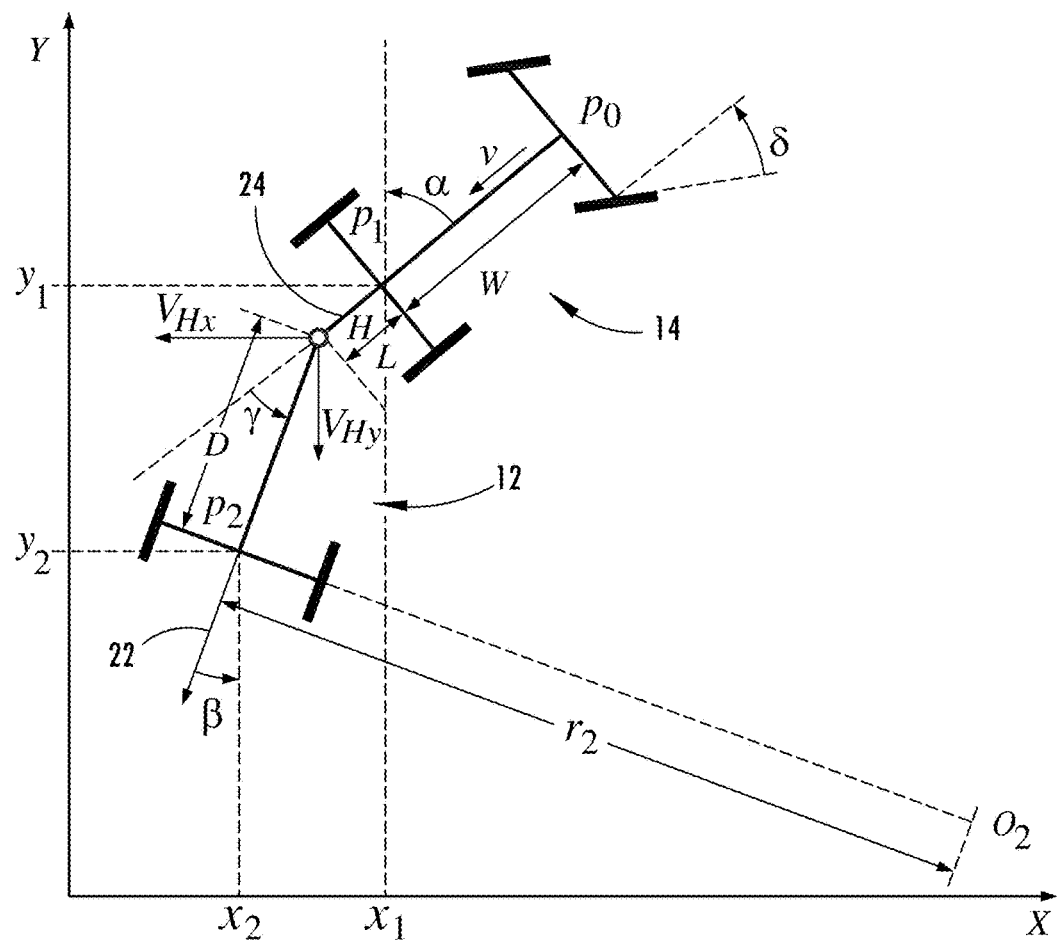
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle (γ=β−α);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

In one example, a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ is can be controlled based on regulating the steering angle δ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma + \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

Additionally, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
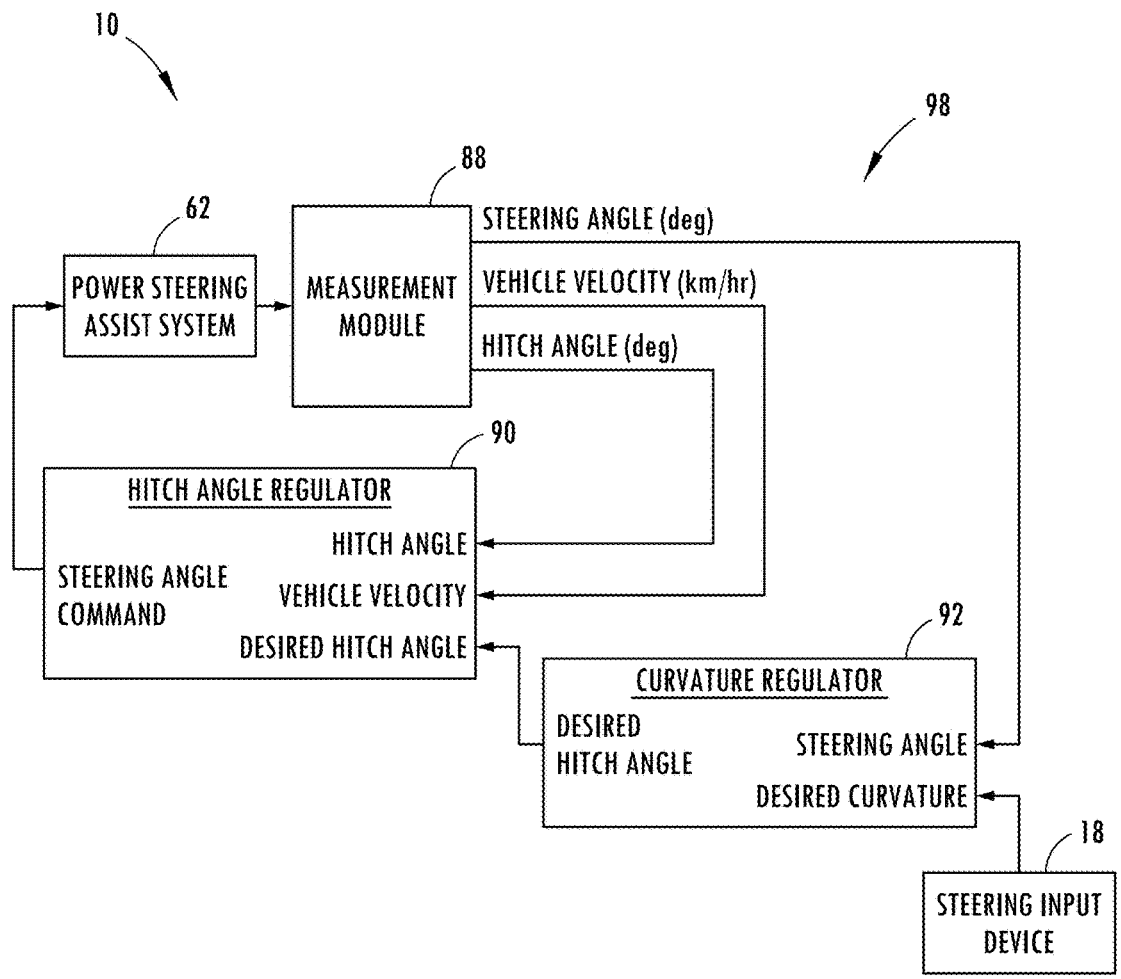
FIG. 4 is a schematic block diagram illustrating portions of a curvature controller, according to an additional embodiment, and other components of the trailer backup assist system, according to such an embodiment.

Yet another example of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle γ(d) based on the current desired curvature $\kappa_2$ along with the steering angle δ provided by a measurement module 88 in this embodiment of the controller 28. The measurement module 88 may be a memory device separate from or integrated with the controller 28 that stores data from sensors of the trailer backup assist system 10, such as the hitch angle sensor 44, the vehicle speed sensor 58, the steering angle sensor, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as a measured or otherwise estimated hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Figure 5:
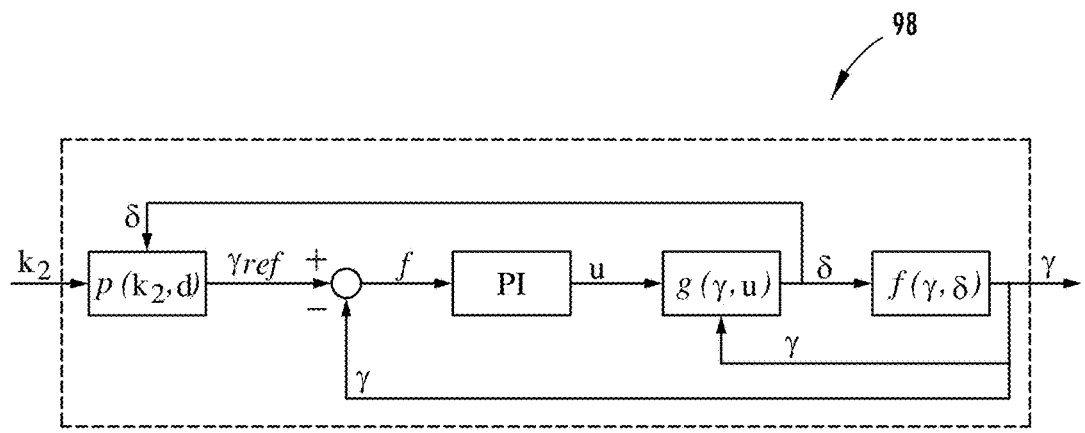
FIG. 5 is a schematic block diagram of the curvature controller of FIG. 5, showing the feedback architecture and signal flow of the curvature controller, according to such an embodiment.

As also shown in FIG. 5, the curvature routine 98 shown in FIG. 4 is illustrated in a control system block diagram. Specifically, entering the control system is an input, $\kappa_2$, which represents the desired curvature 26 of the trailer 12 that is provided to the curvature regulator 92. The curvature regulator 92 can be expressed as a static map, $\rho(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

where, $\kappa_2$ represents the desired curvature of the trailer 12 or $1/r_2$ as shown in FIG. 3;

$\delta$ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

With further reference to FIG. 5, the output hitch angle of $\rho(\kappa_2, \delta)$ is provided as the reference signal, $\gamma_{ref}$, for the remainder of the control system, although the steering angle $\delta$ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

As also shown in FIG. 5, the feedback control law, g(u, $\gamma$, v), is implemented with a proportional integral (PI) controller, whereby the integral portion substantially eliminates steady-state tracking error. More specifically, the control system illustrated in FIG. 4 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta}, \text{ and}$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right).$$

It is contemplated that the PI controller may have gain terms based on trailer length D because shorter trailers will generally have faster dynamics. In addition, the hitch angle regulator 90 may be configured to prevent the desired hitch angle $\gamma(d)$ to reach or exceed a jackknife angle $\gamma(j)$, as computed by the controller or otherwise determined by the trailer backup assist system 10, as disclosed in greater detail herein.

Figure 6:
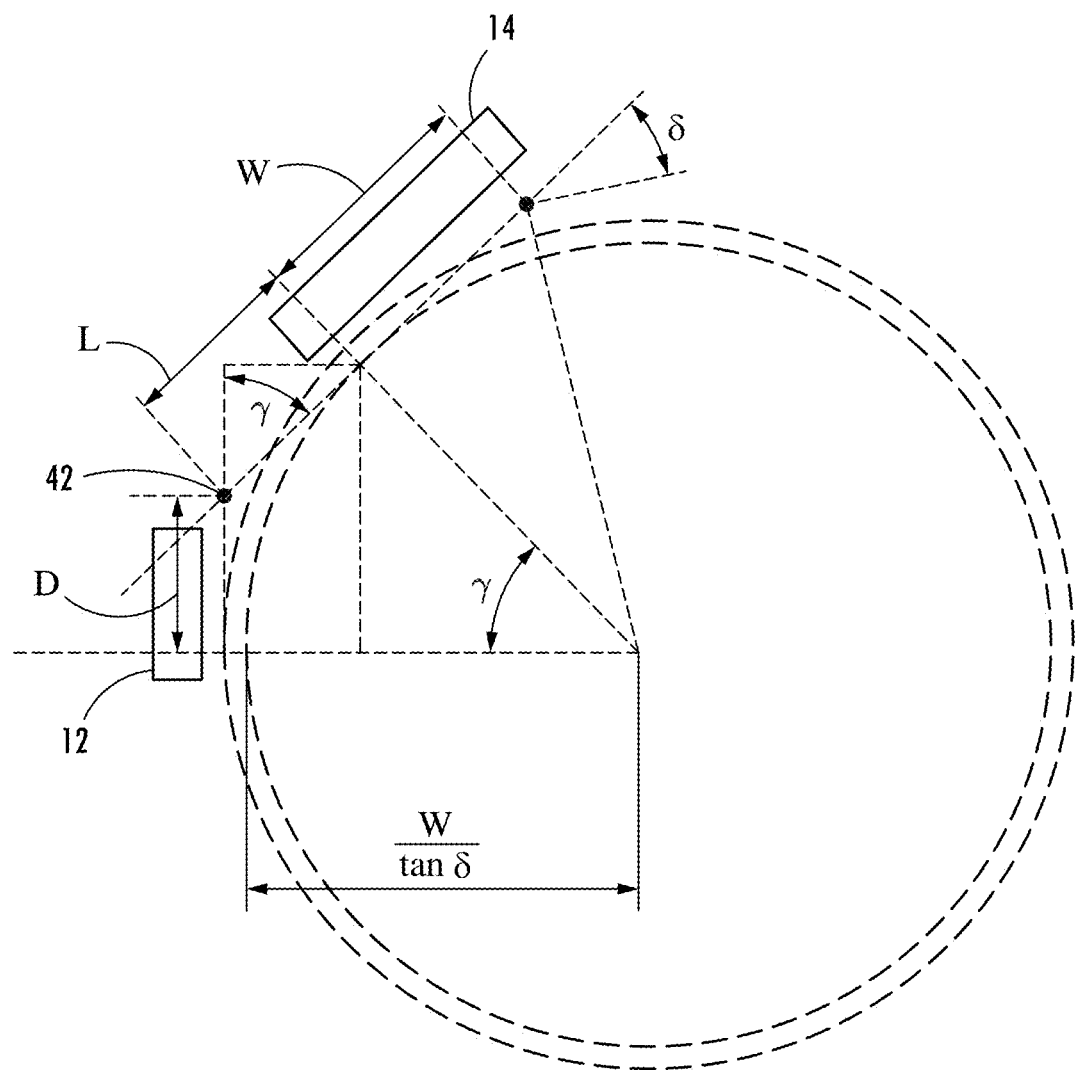
FIG. 6 is a schematic diagram showing a relationship between a hitch angle and a steering angle of the vehicle as it relates to curvature of the trailer and a jackknife angle.

Referring now to FIG. 6, in the illustrated embodiments of the disclosed subject matter, it is desirable to limit the potential for the vehicle 14 and the trailer 12 to attain a jackknife angle (i.e., the vehicle/trailer system achieving a jackknife condition). A jackknife angle $\gamma(j)$ refers to a hitch angle $\gamma$ that, while vehicle 14 is backing, cannot be overcome by the maximum steering input for a vehicle such as, for example, the steered front wheels of the vehicle 14 being moved to a maximum steered angle $\delta$ at a maximum rate of steering angle change. The jackknife angle $\gamma(j)$ is a function of a maximum wheel angle for the steered wheels of the vehicle 14, the wheel base W of the vehicle 14, the distance L between hitch point and the rear axle of the vehicle 14, and the trailer length D between the hitch point and the axle of the trailer 12 or the effective axle when the trailer 12 has multiple axles. When the hitch angle $\gamma$ for the vehicle 14 and the trailer 12 achieves or exceeds the jackknife angle $\gamma(j)$, the vehicle 14 may be pulled forward to reduce the hitch angle $\gamma$. Conversely, under continued backing of vehicle 14, the hitch angle $\gamma$ will continue to increase, regardless of the steering input, toward a collision angle at which point trailer 12 may come into contact with vehicle 14. Thus, for limiting the potential for a vehicle/trailer system attaining a jackknife angle, it is preferable to control the yaw angle of the trailer 12 while keeping the hitch angle $\gamma$ of the vehicle/trailer system relatively small.

In one aspect, a kinematic model representation of the vehicle 14 and the trailer 12 can be used to determine a jackknife angle for the vehicle-trailer combination when the vehicle 14 is moving forward (i.e. towing the trailer 12). Accordingly, with reference to FIGS. 3 and 6, a steering angle limit for the steered front wheels requires that the hitch angle $\gamma$ cannot exceed the jackknife angle $\gamma(j)$, which is also referred to as a critical hitch angle $\gamma$. Thus, under the limitation that the hitch angle $\gamma$ cannot exceed the jackknife angle $\gamma(j)$, the jackknife angle $\gamma(j)$ is the hitch angle $\gamma$ that maintains a circular motion for the vehicle/trailer system when the steered wheels 64 are at a maximum steering angle $\delta(max)$. The steering angle for circular motion with hitch angle $\gamma$ is defined by the following equation.

$$\tan\delta_{max} = \frac{w\sin\gamma_{max}}{D + L\cos\gamma_{max}}$$

Solving the above equation for hitch angle $\gamma$ can allow the jackknife angle $\gamma(j)$ to be determined. This solution, which is shown in the following equation, can, in some instances, be used in implementing trailer backup assist functionality in accordance with the disclosed subject matter for monitoring hitch angle $\gamma$ in relation to jackknife angle.

$$\cos\bar{\gamma} = \frac{-b \pm \sqrt{b^2 - 4ac}}{2a}$$

where, $a = L^2 \tan^2 \delta(max) + W^2$;

$b = 2 LD \tan^2 \delta(max)$; and $c = D^2 \tan^2 \delta(max) - W^2$.

As can be seen above, equations based solely on a vehicle-trailer kinematic model require the distance D from the hitch 42 to the front axle of trailer 12 trailer be known prior to calculating $\gamma(j)$. As discussed above, other dimensions used in these equations, such as the vehicle wheelbase W and the distance to hitch L, are specific to vehicle 14 and can be stored in memory 86 by the manufacturer or dealer. The trailer length D, however, is dependent on the particular trailer 12 coupled with vehicle 14 and, as discussed above, may require measurement and input into memory 86 (such as by HMI 80) by a user. Such a scheme for obtaining a value for trailer length D may be difficult or burdensome for a user and may introduce inaccuracy into the kinematic model that may affect the accuracy of determining the jackknife angle $\gamma(j)$ in a manner that may adversely affect the system. In one example, if a measurement or other inaccuracy causes the estimated or calculated $\gamma(j)$ to be too large, trailer 12 may move into a jackknife condition at a point where system 10 believes such a condition to not yet have been reached. Without an intervening control operation, system 10 may continue to reverse, moving trailer 12 toward or into contact with vehicle 14. Such a situation may be more likely to occur with certain trailer configuration or lengths, where shorter trailers approach and move into a jackknife condition more rapidly than longer trailers, and some geometries independent of trailer length D may position the collision angle particularly close to the jackknife angle $\gamma(j)$, making intervention in such a situation difficult. Further, as mentioned above, must be calculated during forward movement of the vehicle 14 and trailer 12 combination, as the inherently instability of the arrangement during reversing will not result in the above-described circular path, the trailer 12, during reversing, tending to move increasingly closer to vehicle 14, absent corrective steering inputs.

Figure 7:
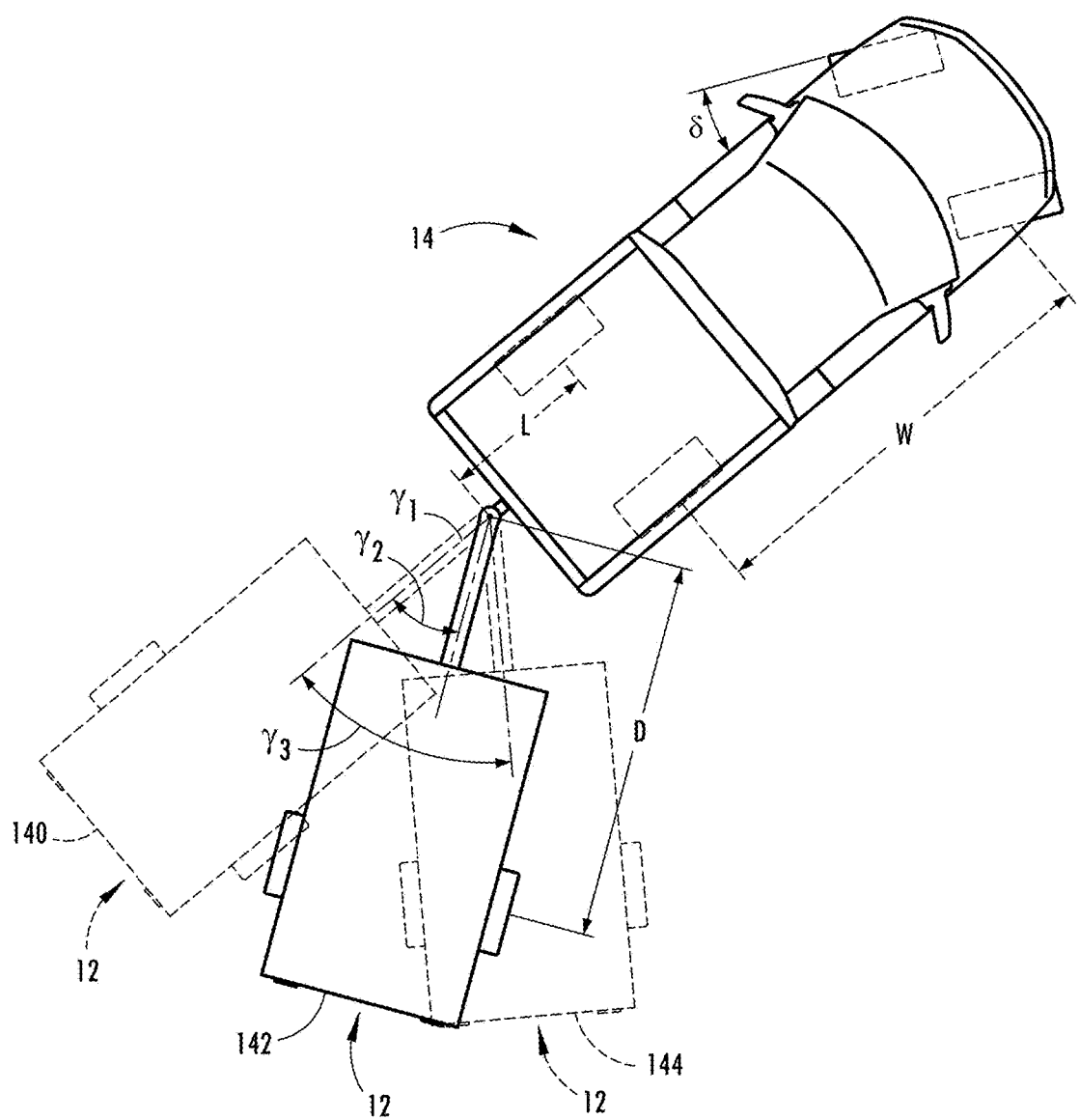
FIG. 7 is a top view showing a trailer positioned with respect to a vehicle at varying hitch angles at varying distances from a jackknife angle.

To reduce or remove the dependence on a measured trailer length D from the ability of system 10 to determine whether trailer 12 is approaching jackknife angle $\gamma(j)$, system 10 may monitor the trailer angle $\gamma$, such as by using a hitch angle sensor 44 or the like, for one or more jackknife indicating characteristic. In particular, there are particular ways in which trailer 12 behaves as it is approaching a jackknife condition that may be observable via the hitch angle $\gamma$. With reference to FIG. 7, a vehicle 14 is shown in various states of reversing a trailer 12, which can include backing thereof along various different curvature paths $\kappa_2$ that correspond with or otherwise result in various positions of trailer 12. In particular, a first position 140 is shown, in which the corresponding hitch angle $\gamma_1$ is relatively low (i.e. close to zero or less than 10°). A second position 142 is also shown in which the hitch angle $\gamma_2$ is larger than $\gamma_1$, but is still within a generally controllable distance from the jackknife angle $\gamma(j)$ (absent a particularly significant adverse condition or the like). Finally, trailer 12 is shown in FIG. 7 in a third position 144 in which the hitch angle $\gamma_2$ is approaching the jackknife angle $\gamma(j)$. It is noted that, while the jackknife angle $\gamma(j)$ is shown in the schematic view of FIG. 7, the actual angle $\gamma(j)$ may be unknown to or unidentified by system 10 through positions 140 and 142. By the time trailer 12 reaches position 144, system 10 may still not precisely know the value for jackknife angle $\gamma(j)$, but may be able to detect that hitch angle $\gamma_3$ is approaching the jackknife angle $\gamma(j)$.

Figure 8A:
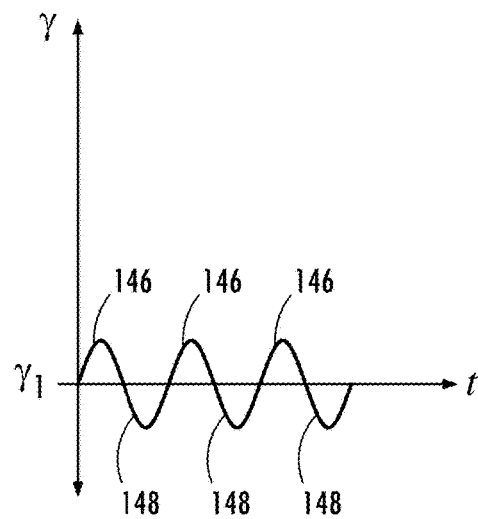
FIGS. 8A, 8B, and 8C are graphic representations of oscillation profiles of the trailer of FIG. 7 corresponding to the varying positions of the trailer shown therein.
Figure 8B:
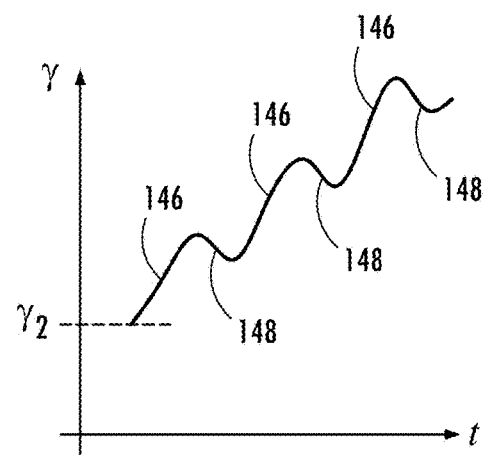
Figure 8C:
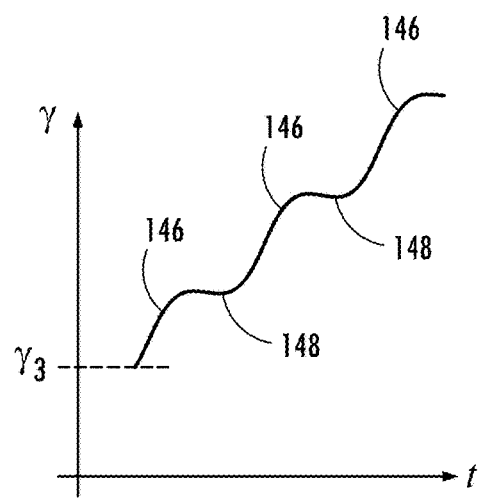

In one embodiment, a condition in which the hitch angle $\gamma$ is approaching a jackknife angle $\gamma(j)$ can be identified by monitoring hitch angle $\gamma$ for a particular response to vehicle yaw. In general, the system shown in FIGS. 3 and 7, in which vehicle 14 is reversing trailer 12, is unstable, such that in any of the positions 140, 142, and 144 of trailer 12 depicted in FIG. 7, trailer 12 will tend to move to increase the hitch angle $\gamma$ under a constant steering angle $\delta$. This instability, in general, may require near constant adjustment of the steering angle $\delta$ to maintain a particular hitch angle $\gamma$ or to maintain trailer 12 along a particular curvature path, as discussed above. Such control is possible because, in normal conditions, various steering inputs to change the steering angle $\delta$ can cause a change in the hitch angle in either direction (i.e. to increase or decrease the hitch angle $\gamma$). However, as discussed above, once the jackknife angle $\gamma(j)$ is crossed, trailer will move so as to increase the hitch angle $\gamma$, regardless of steering input. As shown in FIGS. 8A, 8B, and 8C, the change in hitch angle $\gamma$ in response to varying steering angle $\delta$ changes in proportion to an overall increase in hitch angle $\gamma$ in a manner that can be used to identify a potential jackknife condition before occurrence thereof.

As shown in FIG. 8A, for a trailer position 140 including a low hitch angle $\gamma_1$, a series of successive changes in direction of vehicle yaw by the same amount induce similar changes in hitch angle $\gamma_1$ wherein the hitch angle $\gamma_1$ oscillates by moving in opposite directions at similar magnitudes, meaning that the hitch angle $\gamma_1$ will generally remain close to the initial value. As illustrated in FIG. 8A, the small movements of trailer 12 to the right 146 are of a similar magnitude to the movements to the left 148 with such successive movements of similar magnitude keeping the hitch angle $\gamma$ near the initial hitch angle $\gamma_1$. Such successive changes in direction of vehicle yaw may be implemented by alternately braking the wheels on opposite sides (left and right) of vehicle 14, such as by causing alternate brake pulses thereof, and thereby causing the vehicle to wiggle, a corresponding wiggle being induced in trailer 12 such that hitch angle $\gamma$ responds similarly (such as by the movement shown in FIG. 8A). Such braking can be implemented by system 10 outputting a particular signal to the brake control system 72. Alternatively, vehicle wiggle can be added to the steering input of system 10 to EPAS 62 that is used to maintain trailer 12 along the desired curvature path, as further discussed below. In either case, vehicle wiggle can be caused by system 10 at regular intervals (such as at predetermined times or within a certain time from a change in curvature demand) or constantly during operation of system 10 and, depending on the sensitivity of hitch angle sensor 46, can be implemented in a manner that is imperceptible or, at least, tolerable by a user.

Turning to FIG. 8B it is shown that when a similar trailer wiggle is implemented with trailer 12 positioned such that the initial hitch angle $\gamma_2$ is larger than $\gamma_1$ but still less than the jackknife angle $\gamma(j)$, including outside of a predetermined critical range from jackknife angle $\gamma(j)$, the oscillations 146,148 may still occur in both the left and right directions. However, the oscillations 146 in the direction toward the jackknife angle $\gamma(j)$ may be larger than the oscillations 148 away from the jackknife angle $\gamma(j)$, leading an aggregate trailer wiggle direction to tend toward the overall hitch angle $\gamma$ to increase from the initial hitch angle $\gamma_1$. However, because the trailer wiggle is still indicating responses to steering input in both directions, such a condition may indicate that the initial hitch angle $\gamma_2$ is not yet approaching the jackknife angle $\gamma(j)$ and that trailer 12 can be maintained along the selected curvature $\kappa_2$ that lead to the particular angle $\gamma_2$. Further, after the induced wiggle of trailer 12 has been completed, which can correspond to system 10 obtaining data through a sufficient number of oscillations to determine a hitch angle $\gamma$ below the jackknife angle $\gamma(j)$, system 10 can adjust the steering input $\delta$ to return the hitch angle γ to the initial hitch γ₂ angle or as otherwise needed to maintain the selected curvature κ₂ for trailer 12.

As shown in FIG. 8C, when trailer wiggle is induced with an even larger initial hitch angle γ₃, the comparative magnitude of oscillations 146 toward jackknife angle γ(j) becomes even greater than the magnitude of oscillations 148 away from jackknife angle γ(j) than shown in FIG. 8B and described above. Accordingly, system 10 can be calibrated to identify a hitch angle γ that is determined to be too close in approaching jackknife angle γ(j) such that intervention is required. In particular, system 10 can compare the oscillations toward jackknife angle γ(j) (i.e. increasing hitch angle γ) to those away from jackknife angle γ(j) (i.e. decreasing hitch angle) and determine if a threshold convergence toward jackknife angle γ(j) (based on, for example, the aggregate trailer wiggle direction) has been met or exceeded. For example, system 10 can monitor oscillations 146 and 148 during induced trailer wiggle for oscillations 148 away from jackknife angle γ(j) (and, accordingly, away from vehicle 14) that are below a predetermined threshold of, for example 10% or less than the magnitude of corresponding oscillations 146 toward jackknife angle γ(j). In another example, oscillations 148 away from jackknife angle γ(j) that are 5% or less the magnitude of adjacent oscillations 146 toward jackknife angle γ(j) (i.e. toward the vehicle 14 itself) can be used to indicate a trailer angle γ that is approaching the jackknife angle γ(j). In either example, system 10 can be configured to identify a hitch angle γ that is approaching the jackknife angle γ(j) at a sufficient distance therefrom for system 10 to take action to prevent the jackknife angle γ(j) from being reached. This can include altering the curvature κ₂ of trailer, or changing the steering input δ to reduce the jackknife angle indicating characteristic, which may include increasing the comparative magnitude of oscillations 148 away from jackknife angle γ(j) to adjacent oscillations 146 toward jackknife angle γ(j).

In certain instances of backing the trailer 12, a jackknife enabling condition can arise based on current operating parameters of the vehicle 14 in combination with a corresponding hitch angle γ. This condition can be indicated when one or more specified vehicle operating thresholds are met while a particular hitch angle γ is present. For example, although the particular hitch angle γ is not currently at the jackknife angle for the vehicle 14 and attached trailer 12, certain vehicle operating parameters can lead to a rapid (e.g., uncontrolled) transition of the hitch angle γ to the jackknife angle for a current commanded trailer curvature and/or can reduce an ability to steer the trailer 12 away from the jackknife angle. One reason for a jackknife enabling condition is that trailer curvature control mechanisms (e.g., those in accordance with the disclosed subject matter) generally calculate steering commands at an instantaneous point in time during backing of a trailer 12. However, these calculations will typically not account for lag in the EPAS 62 of the vehicle 14 (e.g., lag in a steering EPAS controller or the like). Another reason for the jackknife enabling condition is that trailer curvature control mechanisms generally exhibit reduced steering sensitivity and/or effectiveness when the vehicle 14 is at relatively high speeds and/or when undergoing relatively high acceleration.

Jackknife determining information may be received by the controller 28, according to, for example, the embodiment discussed above, to process and characterize a jackknife enabling condition of the vehicle-trailer combination at a particular point in time (e.g., at the point in time when the jackknife determining information was sampled, including an instance of induced trailer wiggle). Examples of information that may lead to or increase a jackknife enabling condition include, but are not limited to, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, such information may be continually monitored. Such information may be used to modify the response of system 10 to the above described comparisons of trailer wiggle oscillation magnitude to allow system 10 to have adequate time to respond to a potential convergence toward jackknife angle γ(j), as needed depending on particular circumstances. For example, the threshold percentage magnitude of oscillations 148 away from jackknife angle γ(j) to oscillations 146 toward jackknife angle γ(j) may be increased with increasing vehicle speed V, as increased vehicle speed V may speed convergence of hitch angle γ toward the jackknife angle γ(j). Similar adjustments can be made with respect to other characteristics of vehicle 14 or trailer 12. In a further example, the threshold percentage magnitude of oscillations 148 away from jackknife angle γ(j) to oscillations 146 toward jackknife angle γ(j) may be increased with shorter trailer length D (should such a parameter be presently available for system 10), as increased vehicle speed V may speed convergence of hitch angle γ toward the jackknife angle γ(j).

As discussed above, such a scheme for determining if hitch angle γ is approaching a jackknife angle γ(j) can be carried out without knowing the particular jackknife angle γ(j) for the given trailer 12 and vehicle 14 combination. Further, the scheme can be executed without knowing, for example, the distance D between the hitch and axle of trailer 12. Accordingly, after a certain number of instances of system 10 determining that hitch angle γ has reached a certain threshold distance of the corresponding jackknife angle γ(j), system can use the hitch angles γ in such instances, in light of the factor or distance relating those angles γ to the jackknife angle γ(j) to derive an estimate (such as by averaging) jackknife angle γ(j). The above-discussed equation:

$$\tan\delta_{max} = \frac{W\sin\gamma_{max}}{D + L\cos\gamma_{max}}$$

can then be solved for D to derive an estimated distance D using the estimated jackknife angle γ(j) for $\gamma_{max}$.

Figure 9:
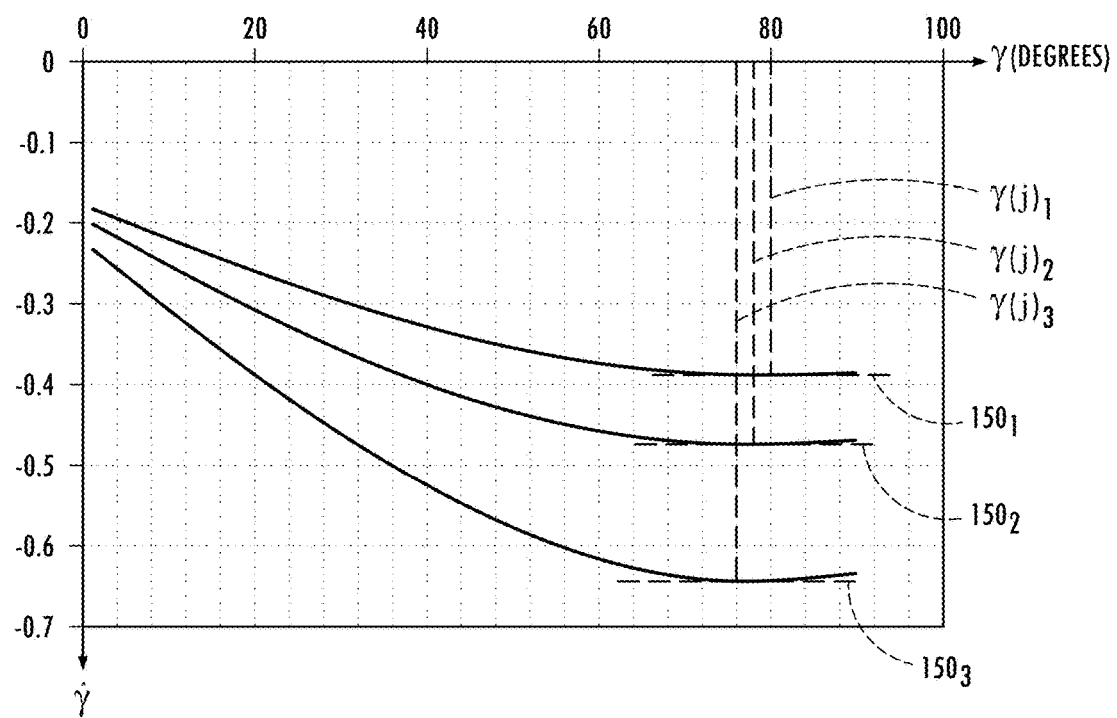
FIG. 9 is a graphical representation of a hitch angle rate of change during reversing of the vehicle of FIG. 7 for varying lengths of the corresponding trailer.

Turning now to FIG. 9, an alternative embodiment of a process for system 10 to identify potential convergence of hitch angle γ to an unidentified jackknife angle is described. In particular, instead of (or in combination with) inducing trailer wiggle, as described above, system 10 can monitor, along with hitch angle γ itself, the rate of change of hitch angle γ̇. In one example, the rate of change of hitch angle γ̇ can be determined using the following equation:

$$\dot\gamma = -\left(\frac{V}{W} + \frac{VL}{WD\cos\gamma}\right)\tan\delta - \frac{V\sin\gamma}{D};$$

where:
γ̇ is the rate of change of the measured hitch angle;

γ is the measured hitch angle;
V is a vehicle longitudinal speed;
W is a wheelbase of the vehicle;
L is a hitch length of the vehicle; and
D is the distance between the hitch and a front axle of the trailer.

The behavior of a trailer 12 being reversed by a vehicle 14 is known to be such that trailer turns about the hitch at a speed that increases toward a maximum at the jackknife angle before slowing again as the hitch angle continues to increase. In other words, the rate of change $\dot{\gamma}$ of the hitch angle γ will increase to a peak value (i.e. an absolute value, regardless of whether a particular direction is measured as negative relative to a second positive direction) at the jackknife angle γ(j). This knowledge can be used in a number of ways to evaluate the rate of change $\dot{\gamma}$ of hitch angle γ to determine if the hitch angle γ is approaching an unidentified jackknife angle γ(j). In one example, given a known trailer length D, system 10 can look for a particular rate of change $\dot{\gamma}$, such as a threshold rate of between about 0.6 and 0.65 for a trailer 12 of about 2 m in length D, a threshold rate of between about 0.45 and 0.47 for a trailer 12 of about 3 m in length D, or a threshold rate of between about 0.36 and 0.38 for a trailer 12 of about 4 m in length.

In another example, system 10 can look at a further rate of change $\ddot{\gamma}$ of the rate of change $\dot{\gamma}$ itself, according to the following equation:

$$\ddot{\gamma} = -\frac{LV\tan\delta \cdot \sin\gamma}{W\delta\cos^2\gamma} - \frac{V\cos\gamma}{\delta}.$$

The result for $\ddot{\gamma}$ can indicate whether, for a constant steering input d and vehicle velocity V, the rate of change $\dot{\gamma}$ of the hitch angle γ is approaching a peak velocity, which may correspond to hitch angle γ approaching the jackknife angle γ(j). Accordingly, system 10 can monitor the rate of change $\ddot{\gamma}$ of the rate of change $\dot{\gamma}$ to determine if $\ddot{\gamma}$ is sufficiently close to zero to require intervention to prevent a jackknife condition from being reached. In one example, system 10 can monitor for $\ddot{\gamma}$ reaching a value of less than 1, or in another example, less than 0.5, or in a further example, less than 0.1 to determine that intervention is needed to prevent hitch angle γ from reaching the jackknife angle γ(j). As discussed above, system 10 can vary the jackknife indicating threshold value of $\ddot{\gamma}$ depending on various vehicle characteristics that may influence the speed at which the hitch angle γ approaches a jackknife angle γ(j) or the ability of system 10 to intervene to prevent a jackknife condition from being reached.

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the power assist steering system 62 being directly coupled to the steering wheel 68. Accordingly, the steering input device 18 of the trailer backup assist system 10 may be used for inputting a desired curvature 26 of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels of the vehicle 14, thereby allowing the steering wheel 68 to be used for commanding changes in the desired curvature 26 of a trailer 12 or otherwise selecting a desired backing path during such trailer backup assist.

Figure 10:
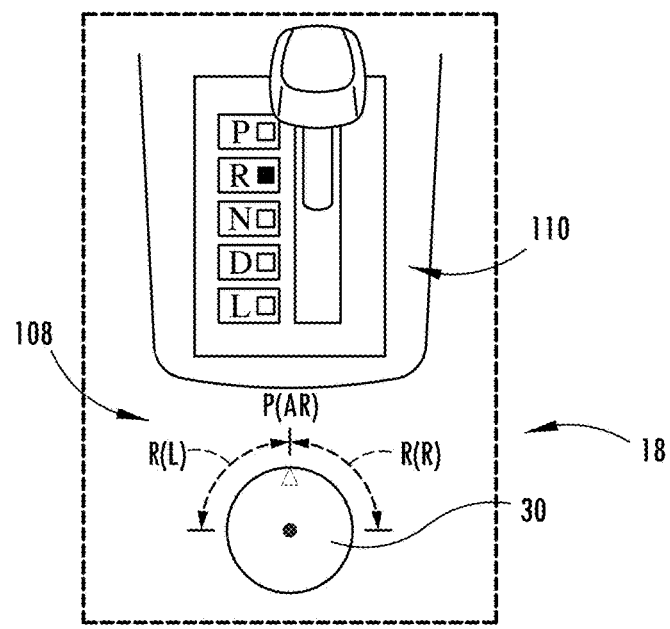
FIG. 10 is a plan view of a steering input device having a rotatable knob for operating the trailer backup assist system, according to one embodiment.

Referring now to FIG. 10, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature $\kappa_2$, such that rotation of the knob to a different angular position provides a different desired curvature with an incremental change based on the amount of rotation and, in some embodiments, a normalized rate, as described in greater detail herein.

Figure 11:
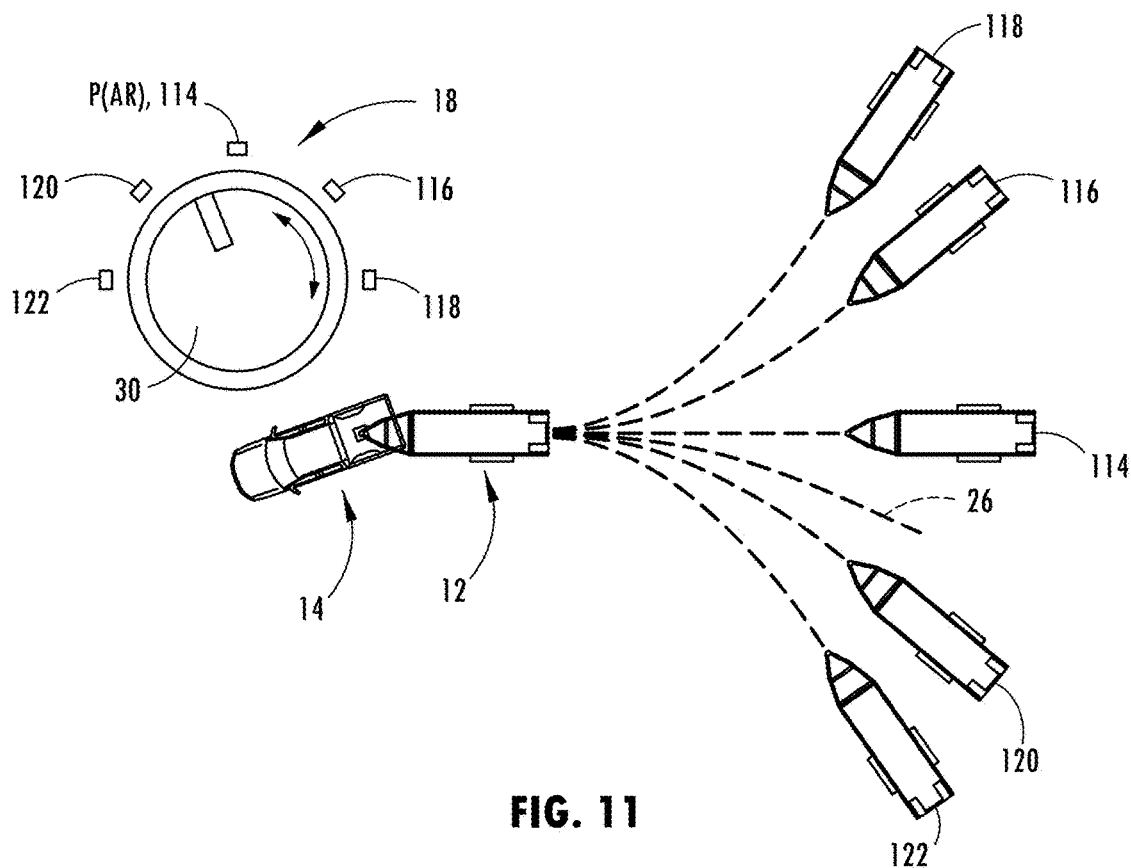
FIG. 11 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIGS. 10 and 11, may be biased (e.g., by a spring return) to a center or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR). It is also contemplated that the rate of rotation of the rotatable knob 30 may also be used to determine the desired curvature output to the controller 28. The at-rest position P(AR) of the knob corresponds to a signal indicating that the vehicle 14 should be steered such that the trailer 12 is backed along a substantially straight backing path 114 (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle 14 steering information causing a jackknife condition.

As shown in FIGS. 10 and 11, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path 26 of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position. It is also conceivable that the steering input device 18 may include a non-rotational control device that may be configured to selectively provide a desired curvature 26 and to override or supplement an existing curvature value. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

Figure 12:
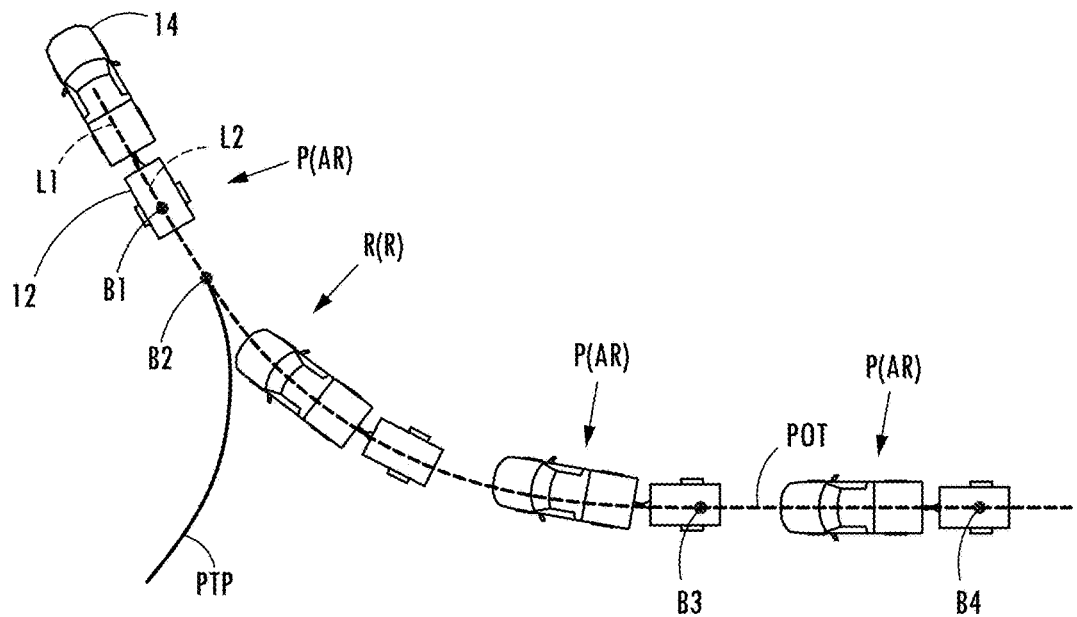
FIG. 12 is a schematic diagram showing a backup sequence of a vehicle and a trailer implementing various curvature selections with the trailer backup assist system, according to one embodiment.

Referring to FIG. 12, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob is in/returned to the at-rest position P(AR).

In the embodiment illustrated in FIG. 12, in order to activate the trailer backup assist system 10, the driver interacts with the trailer backup assist system 10 and the automatically steers as the driver reverses the vehicle 14. As discussed above, the driver may command the trailer backing path 26 by using a steering input device 18 and the controller 28 may determine the vehicle steering angle to achieve the desired curvature 26, whereby the driver controls the throttle and brake while the trailer backup assist system 10 controls the steering. As discussed above, the control of the steering by the system 10 can include adjusting the desired curvature 26 and/or the corresponding steering input $\delta$ to prevent the steering angle $\gamma$ from approaching a jackknife angle $\gamma(j)$, according to one or more of the detection schemes discussed above.

Figure 13:
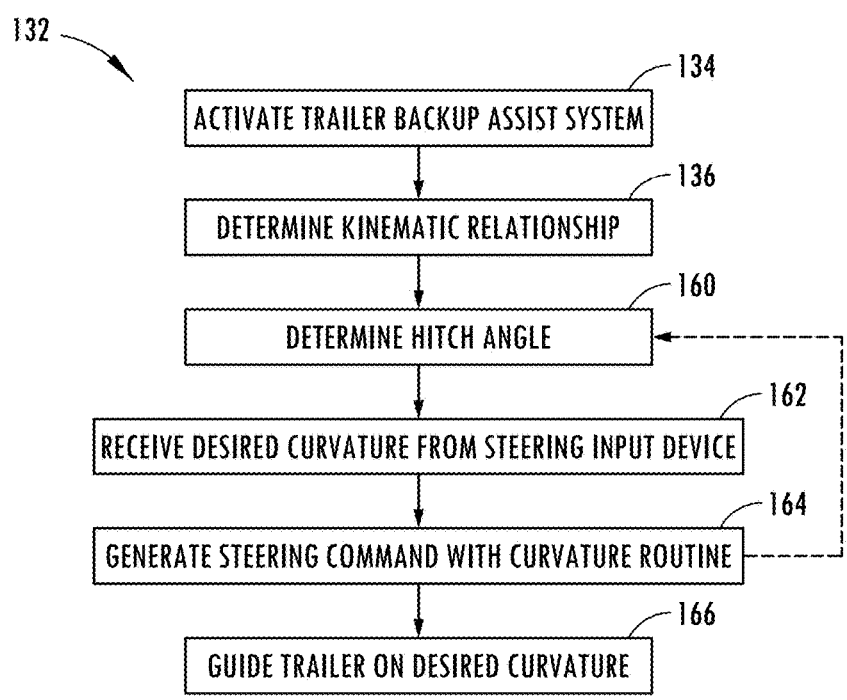
FIG. 13 is a flow diagram illustrating a method of operating a trailer backup assist system using an operating routine for steering a vehicle reversing a trailer with normalized control of the desired curvature, according to one embodiment.

With reference to FIG. 13, a method of operating one embodiment of the trailer backup assist system 10 is illustrated, shown as one embodiment of the operating routine 132 (FIG. 2). At step 134, the method is initiated by the trailer backup assist system 10 being activated. It is contemplated that this may be done in a variety of ways, such a making a selection on the display 82 of the vehicle HMI 80. The next step 136, then determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As disclosed with reference to FIGS. 3-6, the kinematic parameters to define the kinematic relationship include a length of the trailer 12, a wheel base of the vehicle 14, a distance from a hitch connection to a rear axle of the vehicle 14, and a hitch angle $\gamma$ between the vehicle 14 and the trailer 12, among other variables and parameters as previously described. Accordingly, after the kinematic relationship is determined, the trailer backup assist system 10 may proceed at step 160 to determine the current hitch angle such as by use of hitch angle sensor 44 or the like.

Subsequently, at step 162, the position and rate of change is received from the steering input device 18, such as the angular position and rate of rotation of the rotatable knob 30, for determining the desired curvature 26. At step 164, steering commands may be generated based on the desired curvature, correlating with the position and rate of change of the steering input device 18. The steering commands and actuation commands generated may be generated in conjunction with processing of the curvature routine 98, as previous discussed, and including any necessary intervention or adjustment to prevent the hitch angle $\gamma$ from reaching the jackknife angle $\gamma(j)$, as also discussed above. At step 166, the steering commands and actuation commands have been executed to guide the trailer 12 on the desired curvature provided by the steering input device 18.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A backup assist system for a vehicle reversing a trailer coupled with the vehicle at an articulating hitch, comprising:

a hitch angle sensor providing a measured hitch angle of the trailer; and a controller determining a position of the measured hitch angle in relation to an unknown jackknife angle by monitoring for a derivative of a rate of change of the measured hitch angle approaching as a jackknife indicating characteristic.

2. The backup assist system of claim 1, further including:

estimating the jackknife angle based on the measured hitch angle when the derivative of the rate of change of the measured hitch angle is within a predetermined positive range of zero; and estimating a distance between a hitch of the vehicle and a front axle of the trailer using the estimated jackknife angle in a kinematic model.

3. A backup assist system for a vehicle reversing a trailer coupled with the vehicle at an articulating hitch, comprising:

a hitch angle sensor providing a measured hitch angle of the vehicle;

a vehicle brake control system; and a controller:

transmitting an alternate brake pulse signal to the brake control system to cause a vehicle wiggle, the vehicle wiggle inducing a trailer wiggle in the trailer by way of the articulating hitch; and determining a position of the measured hitch angle in relation to an unknown jackknife angle by monitoring an aggregate direction of the trailer wiggle relative to the vehicle for a jackknife indicating characteristic.

4. The backup assist system of claim 3, wherein the jackknife indicating characteristic is a series of oscillations in the measured hitch angle corresponding to the trailer wiggle exhibiting a magnitude, observed in a direction away from the vehicle, below a predetermined threshold value.

5. The backup assist system of claim 3, wherein the jackknife indicating characteristic includes a series of oscillations in the measured hitch angle corresponding to the trailer wiggle aggregating in a direction away from a zero hitch angle.

6. The backup assist system of claim 5, further including identifying the unknown jackknife angle at a measured hitch angle at which none of the series of oscillations decrease the hitch angle.

\* \* \* \* \*

UNITED STATES PATENT AND TRADEMARK OFFICE
CERTIFICATE OF CORRECTION

Page 1 of 1

PATENT NO. : 9,896,126 B2
APPLICATION NO. : 14/794336
DATED : February 20, 2018
INVENTOR(S) : Kyrtsos et al.

It is certified that error appears in the above-identified patent and that said Letters Patent is hereby corrected as shown below:

In the Claims

Column 19:
Claim 1, Line 6;
After "approaching" insert --zero--.

Signed and Sealed this
Twenty-second Day of May, 2018

Andrei Iancu
*Director of the United States Patent and Trademark Office*